F. C. BRAKE.
EGG CANDLING DEVICE.
APPLICATION FILED MAY 26, 1913.
1,110,874.
Patented Sept. 15, 1914.
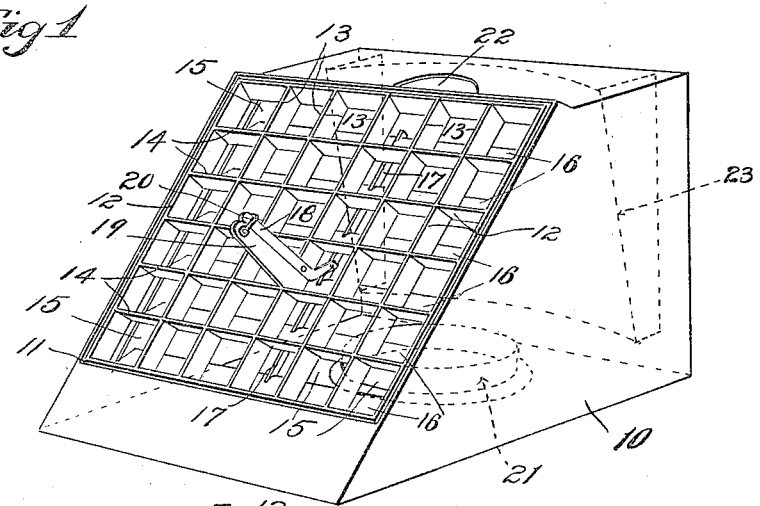
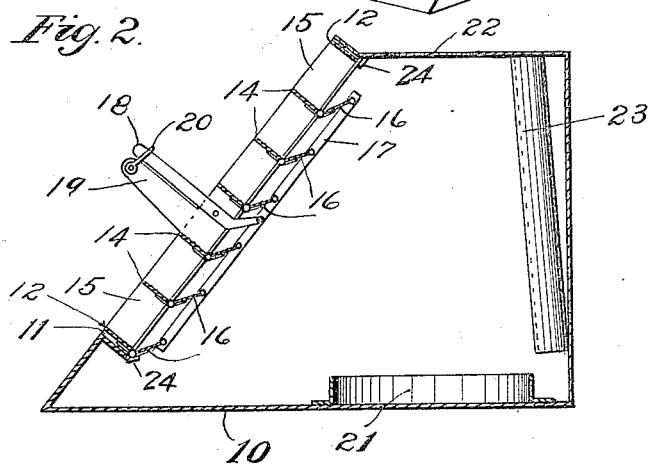
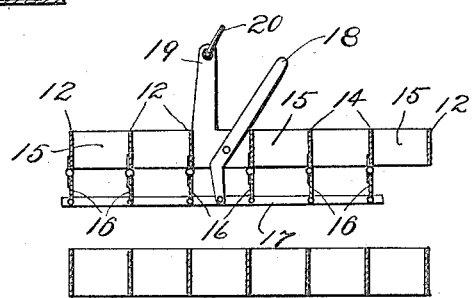
Witnesses
Robert W. Muir
H. A. Bowman
Inventor
Friend C. Brake
By F. A. Whiteley
His Attorney

UNITED STATES PATENT OFFICE.

FRIEND C. BRAKE, OF EDGERTON, MINNESOTA.

EGG-CANDLING DEVICE.

1,110,874. Specification of Letters Patent. Patented Sept. 15, 1914.

Application filed May 26, 1913. Serial No. 769,844.

*To all whom it may concern:*

Be it known that I, FRIEND C. BRAKE, a citizen of the United States, residing at Edgerton, in the county of Pipestone and State of Minnesota, have invented certain new and useful Improvements in Egg-Candling Devices, of which the following is a specification.

My invention relates to an improvement in egg-candling devices, and has for its object to provide a device which will enable a number of eggs to be tested at one operation and then placed in the egg case without the necessity of re-handling them. As a rule three dozen eggs are tested at one time in my device because one tier of an egg case usually holds that number.

At present the country merchant has no available way to protect himself in purchasing eggs from the farmer. Egg candling as heretofore done has been so slow a task that there has been no opportunity to test the eggs as brought in. My invention permits the merchant to examine the eggs as he buys them and return to the farmer all the bad ones, thus obviating a possible loss that might be considerable. The advantages of thus being able to test eggs before the identity of the vendor is lost are many and obvious. The testing is done very rapidly and could serve as a check on the count also.

A merchant provided with my device would be in a position to save money in both buying and selling eggs and would be able to give his customers a service much more satisfactory than the present system of guessing as to an egg's fitness for market.

My invention is of particular value where eggs are shipped to city markets as by it eggs can be tested, counted and placed in the case in very nearly the same time it takes to count and pack them ordinarily.

The full objects and advantages of my invention will appear in connection with the detailed description thereof and are particularly pointed out in the claims.

In the drawings, illustrating the application of my invention in one form, Figure 1 is a perspective view of my invention with details of construction dotted in. Fig. 2 is a sectional side elevation showing my device in operative position. Fig. 3 is a detail view of the egg holder with the representation of a sectional portion of an egg case.

My device comprises a box 10 having its front cut away at a sharp angle leaving a space 11 into which a removable egg holder 12 can be placed at the top and bottom of said space, and set back from the front of the opening, are narrow strips or flanges 24 which provide stops and rests for the bottom of the egg holder 12 as shown. Egg holder 12 comprises a preferably rectangular frame having a plurality of strips 13 running up and down and a plurality of strips 14 running across the frame dividing it into compartments 15 open at the top and bottom and each of a size sufficient to hold one egg. To the bottom of transverse strips 14 and to the bottom of frame of egg holder 12 are hinged strips 16, all of which are joined together by a bar 17 which is actuated by a lever 18 so as to swing strips 16 forward to hold the eggs in holder 12, or back parallel with strips 14 to permit their escape from holder 12. In the center of egg holder 12 a handle 19 is provided to permit its ready removal from one place to another. Bar 17 and lever 18 are preferably so placed that lever 18 can be locked over handle 19, when egg holder 12 is in its egg holding position, by means of a hasp 20 pivotally connected to handle 19 and adapted to swing over lever 18 and hold it securely. Strips 16 are so arranged that when swung clear forward they do not shut off the light coming from within box 10 and when swung back they permit the eggs retained in compartments 15 to pass through and out of holder 12. Box 10 contains a socket 21 or similar means for positioning the light used to candle the eggs. Should a kerosene lamp be used for the light an aperture 22 is provided at the top of box 10 to furnish draft and provide a place for the chimney of the lamp. It is of course understood that any practicable form of light can be used in candling eggs by means of my device, each different form possibly requiring a slightly modified means for positioning the light. Back of the light is a concave cylindrical reflector 23 having its top inclined forward so as to throw the light more strongly on the eggs, particularly the lower ones that otherwise might not be sufficiently illuminated.

In the operation of my egg-candling device the light of kerosene, electricity or gas is placed in the back of the box, the egg holder is removed from the box and the lever locked. The egg holder is then filled with eggs and placed in the aperture in the box prepared for it. Each egg of the three dozen can thus be quickly examined and replaced if found bad. The egg holder is then removed and set directly over an egg case, the lever released and the hinged backs swung down, permitting the eggs to drop directly into the case without the necessity of re-handling them.

The advantages of my device are obvious. It provides an easy, quick and inexpensive method for testing every egg before it is packed for shipment. The recent legislation regarding the sale of bad eggs has made a device of this kind almost indispensable to the country merchant who ships eggs to the city markets. The fact that the eggs are handled in a holder is also a great preventative of breakage as it does away with the re-handling necessary under the old method. The time saved is also a feature. The testing, counting and packing are all done at one operation and much faster than the eggs could be tested alone in the old way.

I claim:

1. An egg-candling device comprising a box having an opening in its front wall, a partitioned egg holder adapted to be removably supported in said opening and comprising a large number of individual egg-compartments each of which is open at top and bottom, an egg-retaining plate hinged to the bottom of each tier of compartments, and manually operated means to shift and latch said plates.

2. An egg-candling device comprising a box having a forwardly and downwardly inclined front wall, said wall having a rectangular opening therein, a partitioned egg holder adapted to rest within said opening in an inclined position, a series of egg-retaining plates, one for each tier of compartments, said plates being hingedly attached to the egg holder, means for turning said plates simultaneously, and a keeper for said turning means.

3. An egg-candling device comprising a box having an opening in its front wall, a partitioned egg holder adapted to be removably supported in said opening and comprising a large number of individual egg-compartments each of which is open at top and bottom, an egg-retaining plate hinged to the bottom of each tier of compartments, a manually operated means to shift and latch said plates, said plates being of less width than the egg-compartments in order to provide gaps for passage of light through the eggs when the plates are in egg-retaining position.

4. An egg-candling device comprising a box having a forwardly and downwardly inclined front wall, said wall having a rectangular opening therein, a partitioned egg holder adapted to rest within said opening in an inclined position, a series of egg-retaining plates, one for each tier of compartments, said plates being hingedly attached to the egg holder and being of less width than the compartments in order to provide gaps for passage of light through the eggs when the plates are in egg-retaining position, means for turning the plates simultaneously, and a keeper for said turning means.

In testimony whereof I affix my signature in presence of two witnesses.

FRIEND C. BRAKE.

Witnesses:
B. P. SCOTT,
F. N. SAUM.

---

Copies of this patent may be obtained for five cents each, by addressing the "Commissioner of Patents, Washington, D. C."